(12) United States Patent
Staudinger et al.

(10) Patent No.: US 11,024,187 B2
(45) Date of Patent: Jun. 1, 2021

(54) AIRCRAFT POSITIONING ON A TAXIWAY

(71) Applicant: THE BOEING COMPANY, Chicago, IL (US)

(72) Inventors: Tyler Staudinger, Huntsville, AL (US); Kevin S. Callahan, Shoreline, WA (US); Isaac Chang, Bellevue, WA (US); Stephen Dame, Everett, WA (US); Nick Evans, Lynnwood, WA (US); Zachary Jorgensen, Owens Cross Roads, AL (US); Joshua Kalin, Huntsville, AL (US); Eric Muir, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 282 days.

(21) Appl. No.: 16/224,885

(22) Filed: Dec. 19, 2018

(65) Prior Publication Data

US 2020/0202733 A1 Jun. 25, 2020

(51) Int. Cl.
*G08G 5/06* (2006.01)
*G01C 23/00* (2006.01)
(Continued)

(52) U.S. Cl.
CPC .......... *G08G 5/065* (2013.01); *G05D 1/0202* (2013.01); *G06N 3/08* (2013.01); *G06T 7/70* (2017.01);
(Continued)

(58) Field of Classification Search
CPC .......... G08G 5/06; G01S 1/02; G01S 13/765; G05D 1/02; G05D 1/0083; B64D 45/00; G01C 23/00; G01C 21/30; B64F 1/002
See application file for complete search history.

(56) References Cited

U.S. PATENT DOCUMENTS 3,407,643 A * 10/1968 Wilson ............... G05D 1/02
  73/1.78
3,501,765 A * 3/1970 Roscoe ............... G01S 1/02
  342/413
(Continued)

FOREIGN PATENT DOCUMENTS

EP  2600330 A1  6/2013
JP  8011796  1/1996
(Continued)

OTHER PUBLICATIONS

Extended European Search Report Pursuant to Rule 62 EPC for EP Application No. 19212698.5 dated Feb. 7, 2020.
Office Action for RU2019136683 dated Nov. 30, 2020.

*Primary Examiner* — Yuri Kan
(74) *Attorney, Agent, or Firm* — Marshall, Gerstein & Borun LLP

(57) ABSTRACT

Systems, methods, and computer-readable media storing instructions for determining cross-track error of an aircraft on a taxiway are disclosed herein. The disclosed techniques capture electronic images of a portion of the taxiway using cameras or other electronic imaging devices mounted on the aircraft, pre-process the electronic images to generate regularized image data, apply a trained multichannel neural network model to the regularized image data to generate a preliminary estimate of cross-track error relative to the centerline of the taxiway, and post-process the preliminary estimate to generate an estimate of cross-track error of the aircraft. Further embodiments adjust a GPS-based location estimate of the aircraft using the estimate of cross-track error or adjust the heading of the aircraft based upon the estimate of cross-track error.

20 Claims, 6 Drawing Sheets

(51) Int. Cl.
*G01C 21/30* (2006.01)
*G06F 17/00* (2019.01)
*G06T 7/70* (2017.01)
*G05D 1/02* (2020.01)
*G06N 3/08* (2006.01)

(52) U.S. Cl.
CPC ............... *G06T 2207/30244* (2013.01); *G06T 2207/30256* (2013.01)

(56) References Cited

U.S. PATENT DOCUMENTS

| | | | |
|---|---|---|---|
| 3,662,977 A * | 5/1972 | Shannon | ................. B64F 1/002 244/114 R |
| 4,050,069 A * | 9/1977 | Schlussler | ............. G01S 13/765 342/33 |
| 5,229,941 A | 7/1993 | Hattori | |
| 6,571,166 B1 | 5/2003 | Johnson et al. | |
| 7,382,284 B1 | 6/2008 | Armstrong et al. | |
| 10,336,466 B1 * | 7/2019 | Schulte | ................. G08G 5/0021 |
| 2004/0230353 A1 * | 11/2004 | Villaume | ............. G05D 1/0083 701/3 |
| 2005/0190079 A1 | 9/2005 | He | |
| 2007/0021908 A1 * | 1/2007 | Jaugilas | ............... G09B 29/106 701/450 |
| 2007/0106433 A1 * | 5/2007 | He | ....................... G08G 5/0021 701/16 |
| 2007/0240056 A1 | 10/2007 | Pepitone | |
| 2007/0241935 A1 | 10/2007 | Pepitone et al. | |
| 2013/0329944 A1 | 12/2013 | Gellaboina et al. | |

FOREIGN PATENT DOCUMENTS

| | | |
|---|---|---|
| RU | 96120879 A | 4/1999 |
| RU | 2434791 C1 | 11/2011 |
| RU | 2584975 C1 | 5/2016 |
| RU | 2017114031 A | 10/2018 |
| WO | WO-2018175441 A1 | 9/2018 |

* cited by examiner

AIRCRAFT POSITIONING ON A TAXIWAY

FIELD

This disclosure relates to systems and methods for positioning and/or guiding an aircraft while traveling along a taxiway or during other surface movement.

BACKGROUND

While taxiing along the ground, aircraft are typically piloted to remain in the center of a taxiway or runway. The aircraft is controlled by a pilot using visual inspection and Global Positioning System (GPS) data regarding the location of the aircraft. For autonomous control, GPS data is the primary technique for determining the local position of the aircraft. Even the best GPS systems have limited accuracy, however, and are subject to loss of signal resulting from environmental conditions, such as weather conditions or intentional or unintentional interference. Thus, supplemental or alternative techniques are needed to address such accuracy limitations and improve robustness of local position estimates.

SUMMARY

An example includes an aircraft guidance or control system for an aircraft, including one or more processors and a program memory storing (i) a multichannel neural network model and (ii) executable instructions that, when executed by the one or more processors, cause the aircraft guidance or control system to: receive a plurality of electronic images from a plurality of electronic imaging devices (e.g., digital cameras or LIDAR units) mounted on the aircraft; pre-process the plurality of electronic images to generate regularized image data; generate a preliminary estimate of a cross-track error of the aircraft relative to a centerline position of the taxiway by applying the multichannel neural network model to the regularized image data; and post-process the preliminary estimate of the cross-track error to generate an estimate of the cross-track error using one or more previous estimates of one or more previous cross-track errors of the aircraft. The plurality of electronic imaging devices are mounted to capture portions of a taxiway while the aircraft is sitting on or traveling along the taxiway.

Another example includes a computer-implemented method for aircraft guidance or control implemented by one or more processors, comprising: accessing a multichannel neural network model stored in a program memory; receiving a plurality of electronic images from a plurality of electronic imaging devices mounted on an aircraft; pre-process the plurality of electronic images to generate regularized image data; generating a preliminary estimate of a cross-track error of the aircraft relative to a centerline position of the taxiway by applying the multichannel neural network model to the regularized image data; and post-processing the preliminary estimate of the cross-track error to generate an estimate of the cross-track error using one or more previous estimates of one or more previous cross-track errors of the aircraft. The plurality of electronic imaging devices are mounted to capture portions of a taxiway while the aircraft is sitting on or traveling along the taxiway.

Yet another example includes a tangible, non-transitory computer-readable medium storing executable instructions for aircraft guidance or control, which executable instructions, when executed by one or more processors of a computer system, cause the computer system to: access a multichannel neural network model stored in a program memory; receive a plurality of electronic images from a plurality of electronic imaging devices mounted on the aircraft; pre-process the plurality of electronic images to generate regularized image data; generate a preliminary estimate of a cross-track error of the aircraft relative to a centerline position of the taxiway by applying the multichannel neural network model to the regularized image data; and post-process the preliminary estimate of the cross-track error to generate an estimate of the cross-track error using one or more previous estimates of one or more previous cross-track errors of the aircraft. The plurality of electronic imaging devices are mounted to capture portions of a taxiway while the aircraft is sitting on or traveling along the taxiway.

The features, functions, and advantages that have been discussed can be achieved independently in various embodiments or may be combined in yet other embodiments further details of which can be seen with reference to the following description and drawings.

DESCRIPTION

Disclosed herein are systems, methods, and non-transitory computer-readable media storing instructions for generating an estimate of cross-track error of an aircraft on a taxiway using a multichannel neural network model and images from electronic imaging devices mounted on the aircraft, such as digital cameras or LIDAR units. The disclosed techniques may be implemented to train a multichannel neural network model for estimating cross-track error of aircraft on taxiways. Additionally or alternatively, the disclosed techniques may be implemented to generate estimates of cross-track error of an aircraft on a taxiway. In some embodiments, the estimates of cross-track error may be used to adjust a GPS-based location estimate of the aircraft. In further embodiments, the estimates of cross-track error may be used to adjust a rudder control of the aircraft to center the aircraft within the taxiway.

Figure 1:
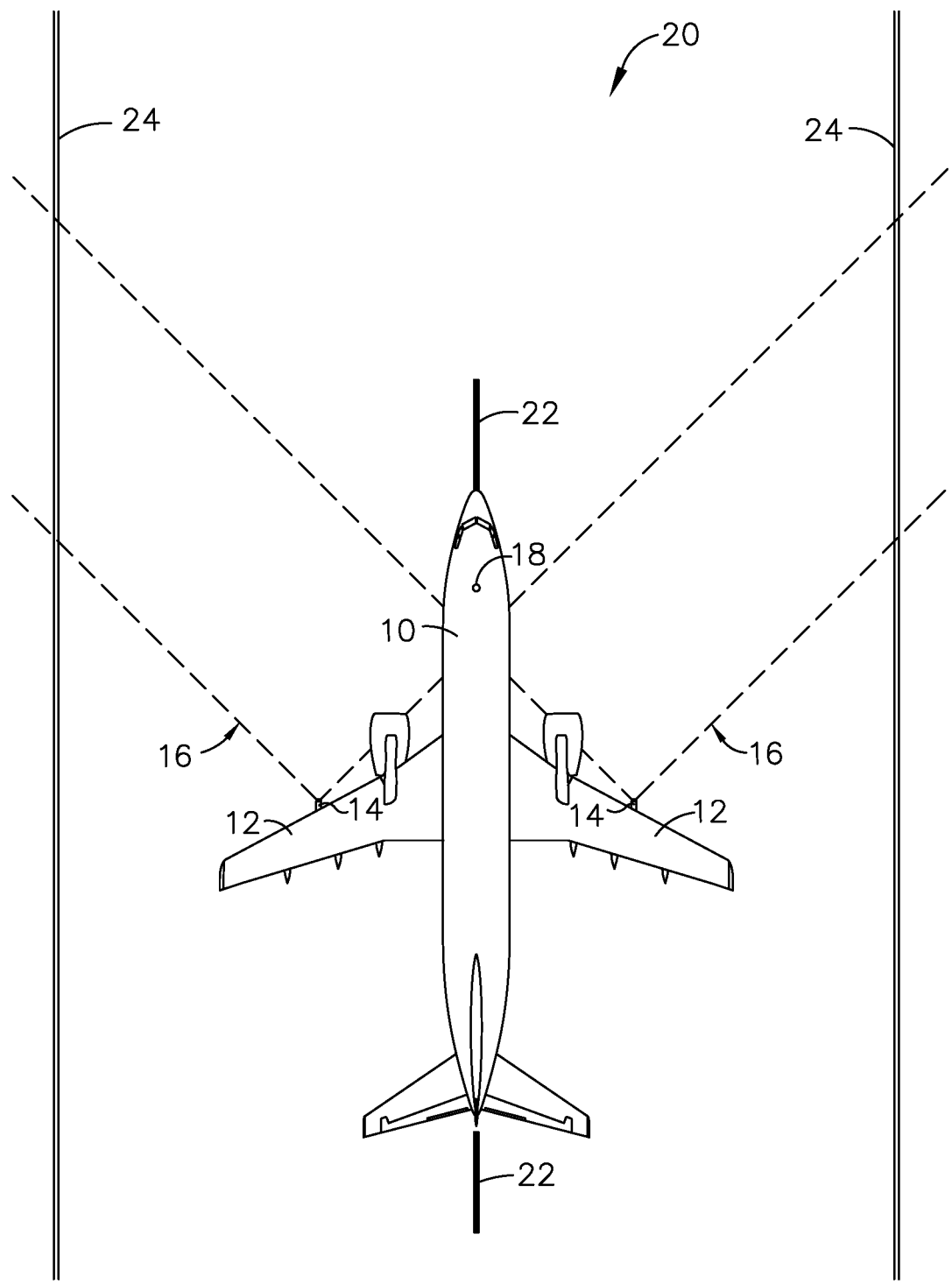
FIG. 1 is a top view of an aircraft on a taxiway.

FIG. 1 illustrates a top view of an aircraft 10 positioned on a taxiway 20. The taxiway 20 has a centerline 22 for use in centering the aircraft 10 while traveling along the taxiway 20. The taxiway 20 also has edge lines 24 on each side that mark the edge of the usable portion of the taxiway 20. The aircraft 10 includes wings 12, which may include a left wing and a right wing. A plurality of electronic imaging devices 14 are mounted on the aircraft 10 to capture electronic images of portions 16 of the taxiway 20 within the field of view of each electronic imaging device 14. In various embodiments, the electronic imaging devices 14 discussed throughout this document include digital cameras, LIDAR units, radar units, ultrasonic sensor units, or other electronic devices configured to generate electronic images of a portion of a local environment. In further embodiments, the electronic imaging devices 14 discussed throughout this document include combinations of two or more of the foregoing types of electronic imaging devices 14, which combinations improve the robustness of the system by using multiple types of image data. As illustrated, some embodiments include an electronic imaging device 14 mounted on each wing 12 to capture images of portions 16 of the taxiway 20 that include the centerline 22 and partially overlap. The aircraft 10 also includes a GPS unit 18 to provide location estimates to the aircraft 10, which GPS unit 18 is a GPS receiver configured to receive and process GPS signals to determine location coordinates.

Figure 2:
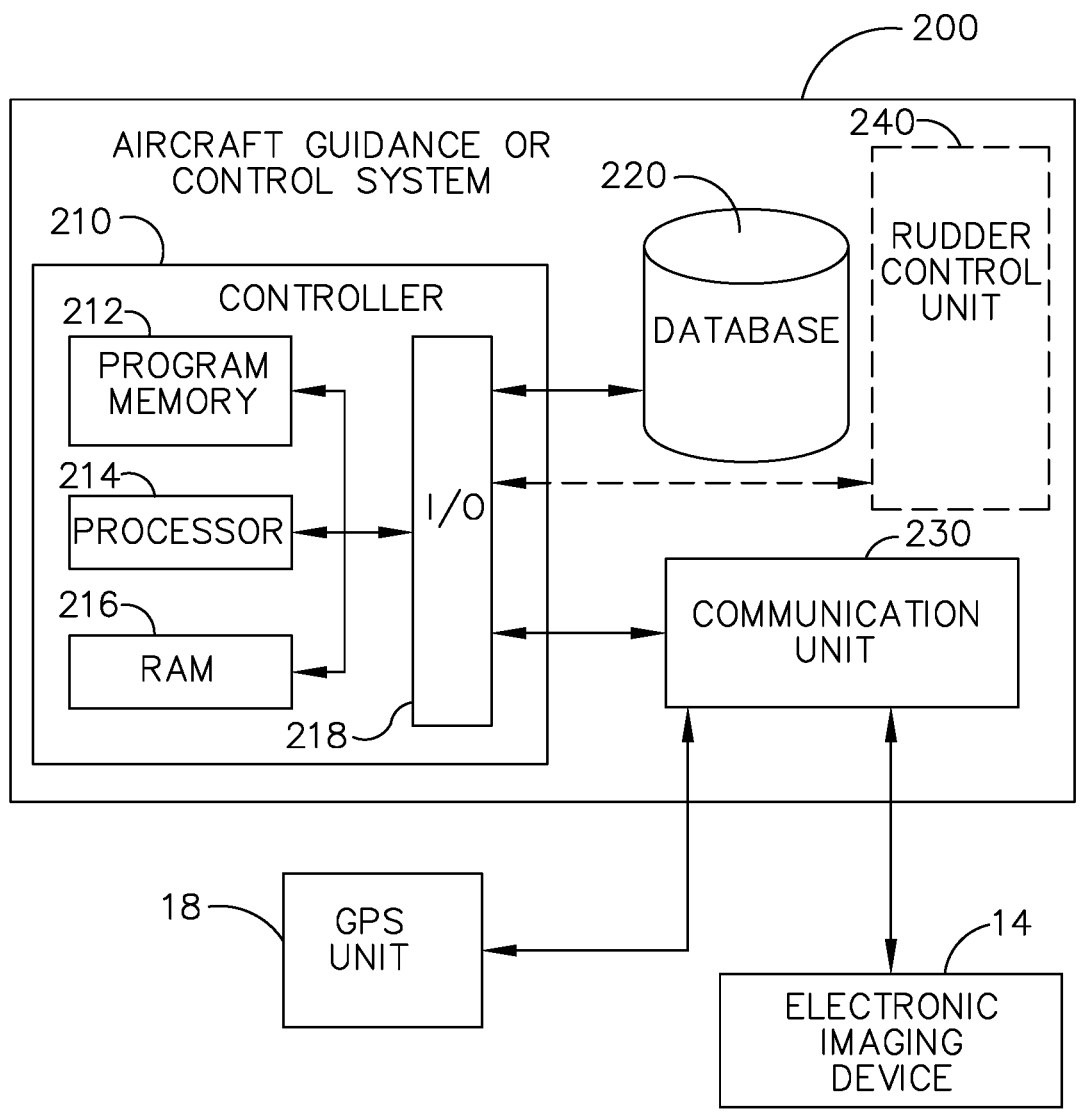
FIG. 2 is a block diagram of an aircraft guidance or control system.

FIG. 2 illustrates, as a block diagram, an aircraft guidance or control system 200 for use in performing part or all of the training method 400 and/or the aircraft guidance or control method 500 described herein. In some embodiments, the aircraft guidance or control system 200 is installed within the aircraft 10 and is configured to guide or control the aircraft 10 during operation. The aircraft guidance or control system 200 includes a controller 210, a database 220, and a communication unit 230. The controller includes one or more of each of the following: a program memory 212, a processor 214, and a random access memory (RAM) 216. Each program memory 212 is a non-transitory, tangible memory device configured to store electronic data, such as instructions for implementing processes, routines, and software programs. Each processor 214 is adapted and configured to execute computer-executable instructions, such as software programs, applications, and routines. Each RAM 216 is configured as a volatile memory for storing electronic data while in use.

Each of the program memory 212, processor 214, and RAM 216 is connected to an input/output (I/O) circuit 218, which I/O circuit 218 also connects the controller 210 to the other components of the aircraft guidance or control system 200 (i.e., the database 220, the communication unit 230, and any rudder control unit 240). The database 220 is configured to store electronic data in a non-transitory, tangible memory device for use by software applications. In some embodiments, the database 220 and the program memory 212 may be combined into a single memory. The communication unit 230 is a component of the aircraft guidance or control system 200 configured to manage communication between the controller 210 and external devices that are communicatively connected to the aircraft guidance or control system 200, such as the electronic imaging devices 14 and GPS unit 18 of the aircraft 10.

Although illustrated as connected to the electronic imaging devices 14, the aircraft guidance or control system 200 includes the electronic imaging devices 14 in some embodiments in order to improve control of the image data from the electronic imaging devices 14. In additional or alternative embodiments, the aircraft guidance or control system 200 likewise includes the GPS unit 18. In further additional or alternative embodiments, the aircraft guidance or control system 200 includes a rudder control unit 240 configured to determine and/or implement adjustments to the heading of the aircraft 10 by controlling a rudder of the aircraft 10. Additional or alternative embodiments of the aircraft guidance or control system 200 may include fewer, additional, or alternative components, as well as any combination of components illustrated in FIG. 2.

Figure 3:
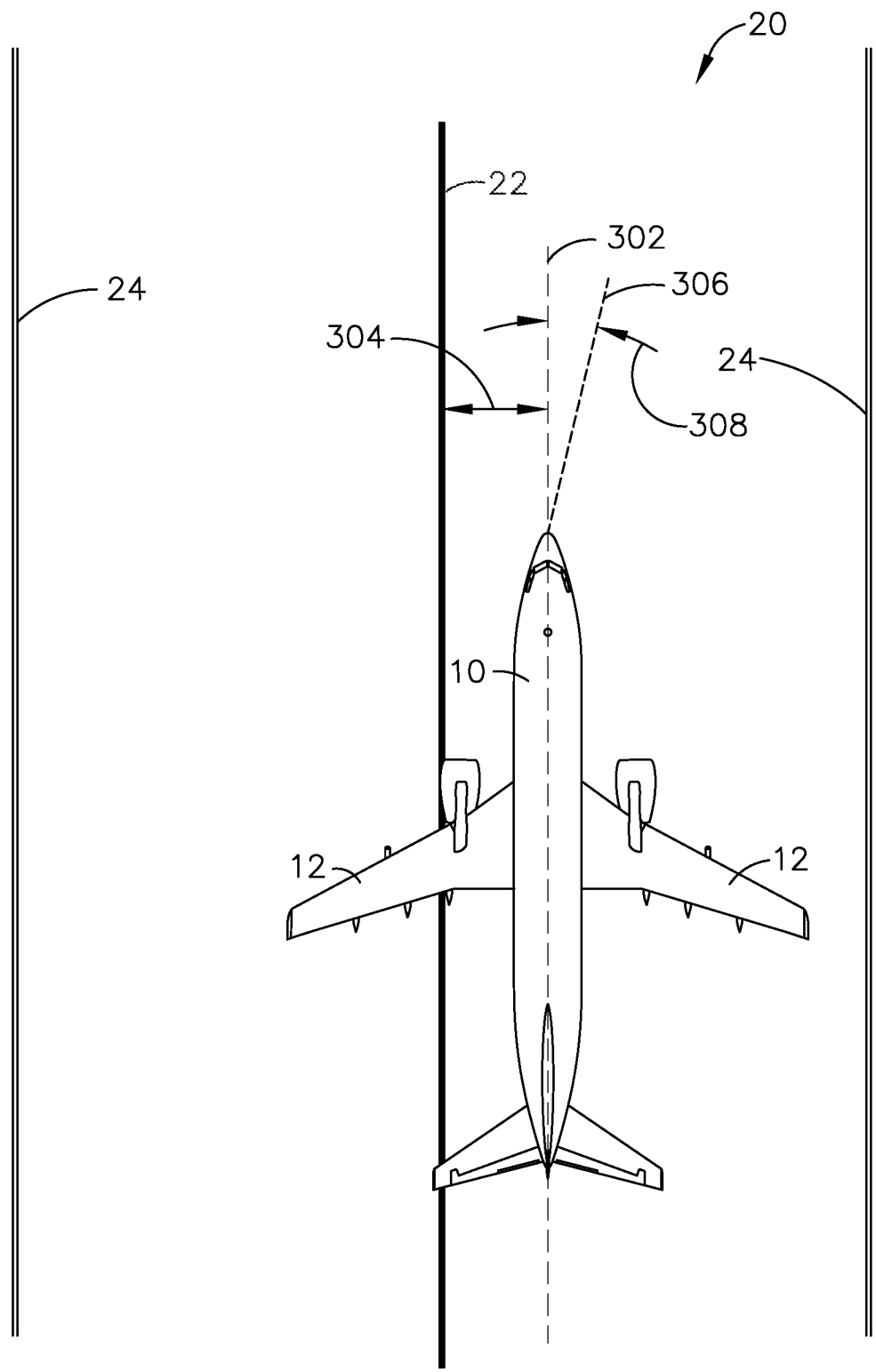
FIG. 3 is a top view of cross-track error of an aircraft on a taxiway.

FIG. 3 illustrates a top view of the aircraft 10 on the taxiway 20, showing a cross-track error 304 between the centerline 22 and a centering position line 302 of the aircraft. The cross-track error 304 of the aircraft 10 indicates the distance along the ground between a centering location of the aircraft 10 (projected onto the taxiway 20) and the nearest point along the centerline 22. This is equivalent to the distance between the centerline 22 and the centering position line 302 running parallel to the centerline 22, which centering position line runs through a point on the surface of the taxiway 20 that is directly below the centering position of the aircraft 10. Thus, the cross-track error 304 represents the distance the center of the aircraft 10 is offset from the centerline 22 of the taxiway 20 in a direction perpendicular to the centerline 22 and along the surface of the taxiway 20. As an example, an aircraft having its center located directly above a spot that is 1.0 meters to the right of the centerline 22 would have a cross-track error 304 of 1.0 meters, while another aircraft having its center located directly above a spot that is 1.2 meters to the left of the centerline 22 would have a cross-track error 304 of −1.2 meters.

Additionally, in some embodiments, the heading 306 of the aircraft 10 along the surface of the taxiway 20 is determined. The a relative heading 308 indicates the angle between the centering position line 302 and the heading 306 of the aircraft. As the centering position line 302 is parallel to the centerline 22, the relative heading 308 also indicate the angle between the centerline 22 and the heading 306 of the aircraft 10 on the surface of the taxiway 20.

Figure 4:
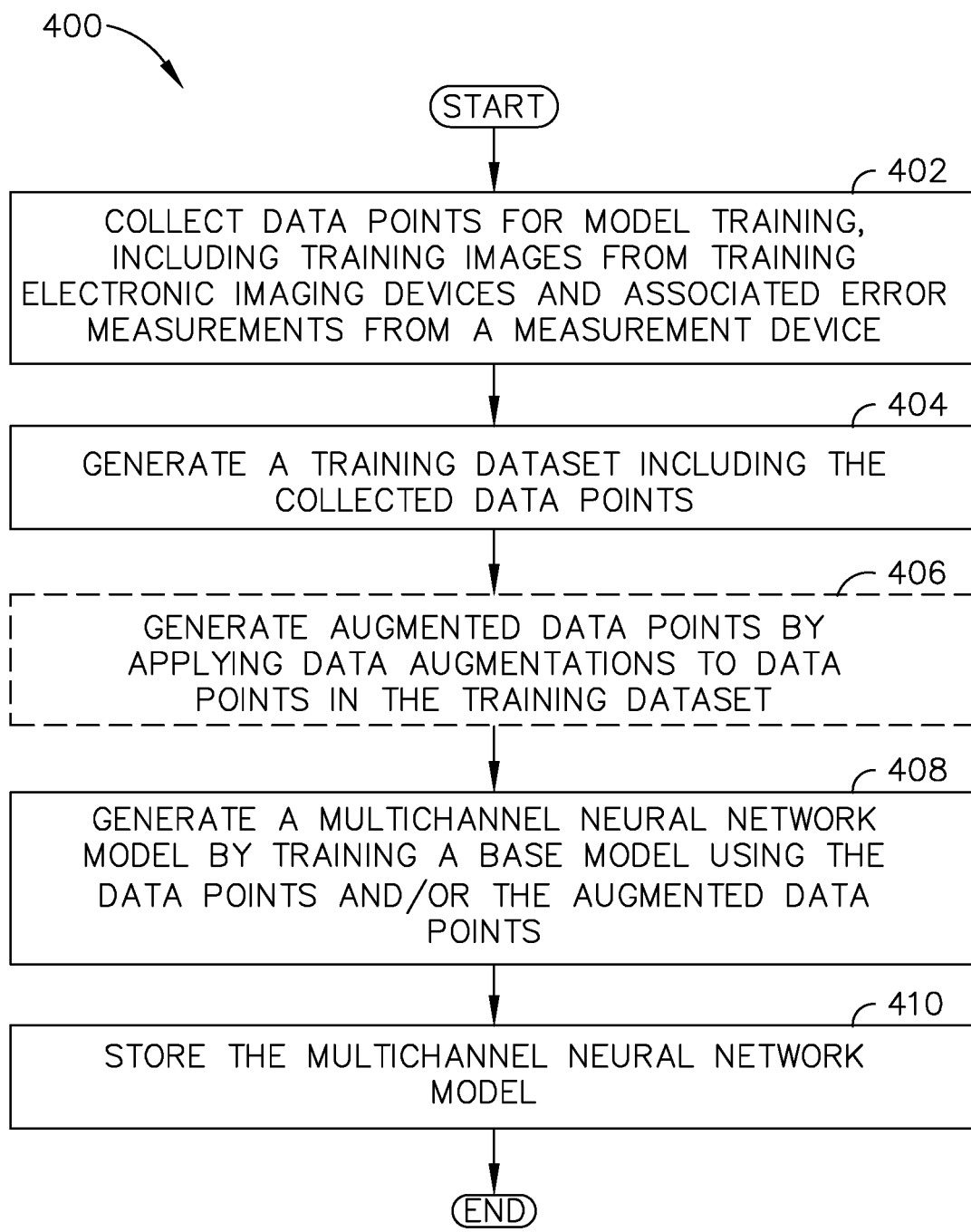
FIG. 4 is a flow diagram of an exemplary training method.

FIG. 4 illustrates an exemplary flow diagram of a training method 400 for training a multichannel neural network model to estimate cross-track error 304 for an aircraft 10 using image data from a plurality of electronic images. The training method 400 includes collecting data points, generating a training dataset, and training the multichannel neural network model using the training dataset. In some embodiments, data augmentations may be generated and used to improve the accuracy and robustness of the multichannel neural network model to noise (e.g., jitter or image rotation) in the input data. The processor 214 of the aircraft guidance or control system 200 (or a similar processor of another similar computing system) implements computer-executable instructions to implement the training method 400, which computer-executable instruction may be stored in the program memory 212 (or a similar memory of a similar computing system). Although the training method 400 is described herein by reference to the aircraft guidance or control system 200 for clarity, other similar computing systems may be used, as will be readily apparent to those of ordinary skill in the art.

The training method 400 begins with the collection of data points for training the multichannel neural network model (block 402), which data points each include an error measurement and one or more training images. A training dataset is then generated from the collected data points (block 404). In some embodiments, additional augmented data points are generated by applying data augmentations to the collected data points in the dataset (block 406). A base model is then trained using the collected data points in the dataset and/or the augmented data points to generate the multichannel neural network model (block 408), which multichannel neural network model is then stored in a computer memory for later use (block 410).

At block 402, the aircraft guidance or control system 200 collects a plurality of data points for model training. Each data point includes the following: (i) a set of a plurality of training images and (ii) an error measurement associated with the set of training images and indicating a distance from a centerline 22 of a taxiway 20, which may be a training centerline of a training taxiway. In some embodiments, collecting the data points includes generating the data points using one or more measurement devices and one or more training electronic imaging devices, such as the electronic imaging devices 14 of the aircraft guidance or control system 200. Each measurement device is a device configured to determine a high-accuracy location of the measurement device and/or determine a distance between the location of the measurement device and another location. In some embodiments, the measurement device includes a high-accuracy GPS unit or Assisted GPS (A-GPS) unit.

In some embodiments, each data point further includes a heading relative to the training centerline of the training taxiway, which heading is associated with the set of training images of the data point. The heading included in the data point may be a heading 306 or a relative heading 308 of a training aircraft. Such heading may be used to train the multichannel neural network model, as discussed below.

At block 404, the aircraft guidance or control system 200 generates a dataset containing the plurality of data points. In some embodiments, the dataset is stored in the database 220 as structured data in a relational or non-relational database format. The dataset is configured such that each data point includes (i) a set of a plurality of training images collected at a time and (ii) an error measurement associated with the set of training images. In some embodiments, each data point further includes (iii) a heading relative to the training centerline of the training taxiway. In further embodiments, generating the dataset includes pre-processing the training images to generate regularized image data corresponding to each of the training images, as described in further detail below with respect to the aircraft guidance or control method 500.

At block 406, in some embodiments, the aircraft guidance or control system 200 generates augmented data points by applying one or more data augmentations to a plurality of the training images collected by the aircraft guidance or control system 200. Applying a data augmentation to an image includes processing such image to add, remove, or modify image attributes. In some embodiments, the data augmentations include one or more of the following: vertical jitter, rotation, or anomalous image artifacts. Such data augmentations simulate sources of noise (or environmental sources of error) in images captured by electronic imaging devices 14 mounted on an aircraft 10 while moving, thus enabling the model to be trained to account for such noise. Vertical jitter data augmentations adjust the vertical position of the captured image in order to simulate movement in the vertical direction of a electronic imaging device 14 mounted on a wing 12 during taxiing. Rotation data augmentations rotate the captured image by various degrees in order to simulate rotational movement of a electronic imaging device 14 mounted on a wing 12 during taxiing. Anomalous image artifact augmentations add artificial image artifacts of the sort that occasionally occur in captured images, such as lens flares or sampling resolution artifacts. In further embodiments, additional or alternative data augmentations are applied to the training images, such as data augmentations that add noise to an image (by randomly adjusting values of individual pixels), blurring an image (by averaging pixel values), or adjusting image brightness (by increasing or decreasing the lightness value of at least some pixels in the image).

When data augmentations are applied, the resulting augmented training images may further be cropped or resized to produce images suitable for training the multichannel neural network model. In some embodiments, the augmented training images of the augmented data points are further pre-processed to generate regularized image data, as described in further detail below with respect to the aircraft guidance or control method 500. In further embodiments, the augmented data points are added to the training dataset.

At block 408, the aircraft guidance or control system 200 generates the multichannel neural network model by training a base model using the data points of the training dataset. Training the base model using the data points produces a more accurate model specifically configured to estimate the cross-track error 304 for an aircraft 10 on a taxiway 20. In some embodiments, an inverted residual block model is used as the base model, as such models are particularly well suited to image analysis tasks. Training the multichannel neural network model includes accessing the training dataset including the plurality of data points, then applying a training algorithm to the data points in the training dataset as inputs to obtain the multichannel neural network model as a trained version of the base model. In some embodiments, the base model may further be trained using the augmented data points by accessing the augmented data points and applying the training algorithm to the augmented data points in order to refine the multichannel neural network model. However trained, the resulting multichannel neural network model is adapted and configured to process image data to generate estimates of cross-track error 304 based upon the image data. The trained multichannel neural network model includes a set of rules to apply to the image data to estimate cross-track error 304. In some embodiments in which the data points and/or augmented data points include headings relative to the training centerline, the multichannel neural network model is additionally trained to generate estimates of a heading 306 or a relative heading 308 of an aircraft 10 based upon image data.

At block 410, the aircraft guidance or control system 200 stores the multichannel neural network model in a computer memory, which may be the program memory 212 or the database 220. In some embodiments, multiple versions of the multichannel neural network model are generated and stored for later testing and use in aircraft guidance or control.

Figure 5:
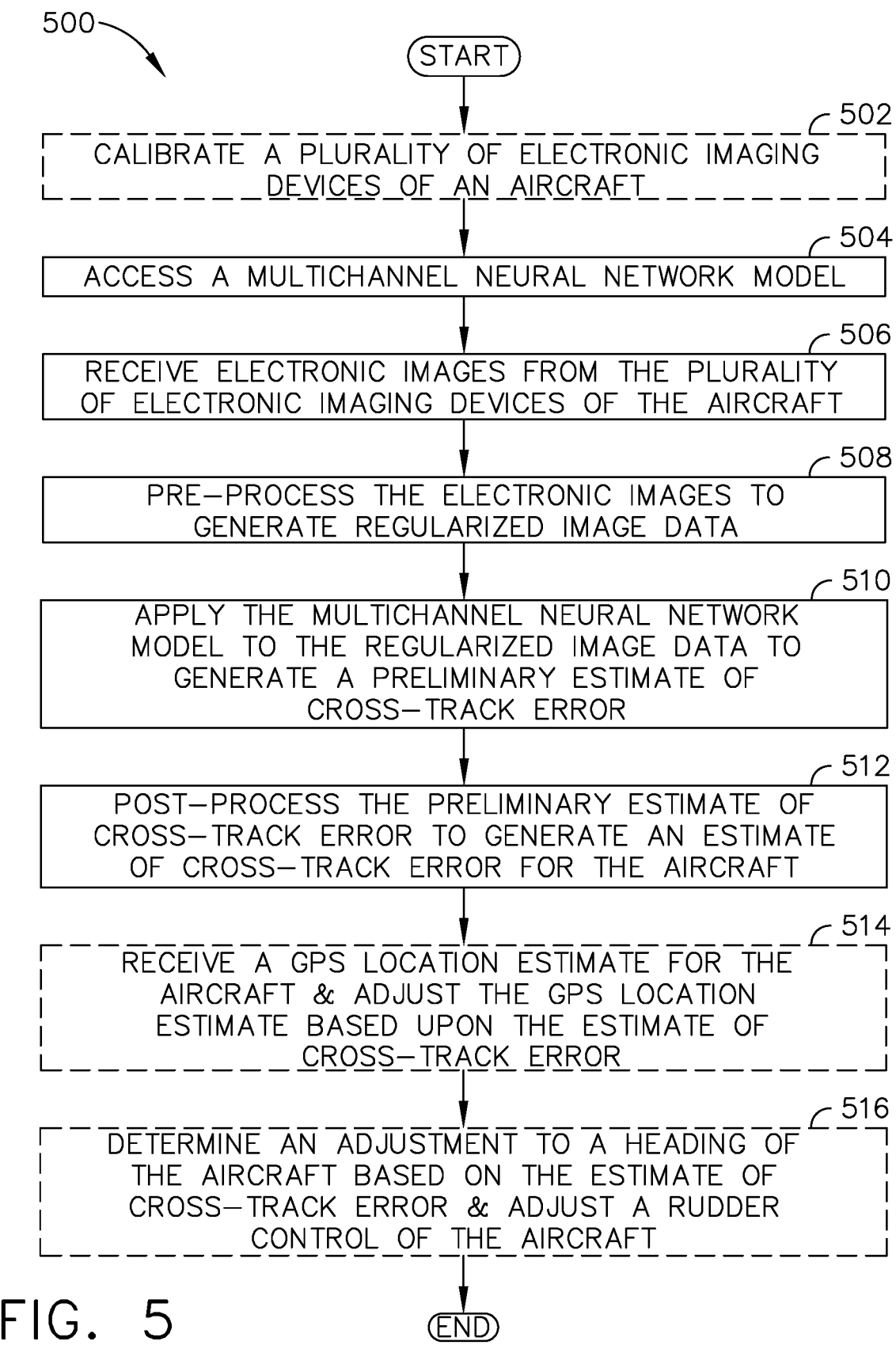
FIG. 5 is a flow diagram of an exemplary aircraft guidance or control method.

FIG. 5 illustrates an exemplary flow diagram of an exemplary aircraft guidance or control method 500 for estimating cross-track error 304 of an aircraft 10 on a taxiway 20. The aircraft guidance or control system 200 implements the aircraft guidance or control method 500 to obtain electronic images, pre-process the electronic images, generate a preliminary estimate of cross-track error 304, and post-process the preliminary estimate to generate an estimate of the cross-track error 304 of the aircraft 10 relative to the centerline 22 of the taxiway 20. In some embodiments, the processor 214 of the aircraft guidance or control system 200 implements computer-executable instructions to implement the aircraft guidance or control method 500, which computer-executable instruction may be stored in the program memory 212.

The aircraft guidance or control method 500 begins, in some embodiments, by calibrating the plurality of electronic imaging devices 14 mounted on the aircraft 10 (block 502). The multichannel neural network model is accessed from a program memory 212 (block 504), and electronic images are received from the electronic imaging devices 14 (block 506). The electronic images are pre-processed to generate regularized image data (block 508). The multichannel neural network model is then applied to the regularized image data to generate a preliminary estimate of the cross-track error 304 (block 510). This preliminary estimate of the cross-track error 304 is then further post-processed to generate an estimate of the cross-track error 304 of the aircraft 10 (block 512), which may be used in guidance or control of the aircraft 10. In some embodiments, the estimate of the cross-track error 304 may be used to correct a location estimate from a GPS unit 18 of the aircraft 10 (block 514). In further embodiments, the estimate of the cross-track error 304 may be used by a rudder control unit 240 to determine and implement an adjustment to a heading of the aircraft 10 (block 516).

At block 502, in some embodiments, the aircraft guidance or control system 200 calibrates the plurality of electronic imaging devices 14 to correct for any movement or shifting of such electronic imaging devices 14 from expected positions. One or more electronic images received from each electronic imaging device 14 may be used in calibration. Each electronic imaging device 14 is calibrated based upon one or more positions of one or more external portions of the aircraft 10 within the electronic images. Such positions of external portions of the aircraft 10 may include an engine cowling, a wheel or landing gear, or other portion of the aircraft 10 visible within the field of view of the electronic imaging device 14. In some embodiments, markings painted on the exterior of the aircraft 10 may aid alignment of the electronic imaging devices 14.

At block 504, the aircraft guidance or control system 200 accesses a multichannel neural network model from a program memory 212 or in a database 220 of the aircraft guidance or control system 200. The multichannel neural network model accessed by the aircraft guidance or control system 200 is a pre-trained model, such as a model trained and stored in a computer memory as described with respect to the training method 400 described above. In some embodiments, the processor 214 accesses the multichannel neural network model from the memory and stores a copy in the RAM 216 for use in processing image data, as discussed further below.

At block 506, the aircraft guidance or control system 200 receives a plurality of electronic images from a plurality of electronic imaging devices 14 mounted on the aircraft 10. The plurality of electronic imaging devices are mounted on the aircraft 10 in such manner as to capture portions 16 of the taxiway 20 while the aircraft 10 is sitting on or traveling along the taxiway 20. In some embodiments, the plurality of electronic imaging devices 14 includes at least the following two electronic imaging devices 14: a left wing electronic imaging device 14 mounted on a left wing 12 of the aircraft 10 and a right wing electronic imaging device 14 mounted on a right wing 12 of the aircraft 10. In such embodiments, the plurality of electronic images includes a left channel having electronic images from the left wing electronic imaging device 14 and a right channel having electronic images from the right wing electronic imaging device 14. Such left channel and right channel may be separately provided to the multichannel neural network model to improve model accuracy by adding the relative position data inherent in the identification of the electronic images as being images of the left channel or right channel. In such embodiments, the multichannel neural network model is configured to receive left and right channel data, such as pre-processed versions of the left channel and the right channel in the regularized image data.

At block 508, the aircraft guidance or control system 200 pre-processes the plurality of electronic images to generate regularized image data for analysis by the multichannel neural network model. Such pre-processing regularizes the data to provide better inputs to the multichannel neural network model, thereby enabling the multichannel neural network model to generate more accurate outputs. In some embodiments, pre-processing the plurality of electronic images includes removing one of more portions of each of the plurality of electronic images. In further embodiments, pre-processing the plurality of electronic images to generate the regularized image data includes resizing each of the plurality of electronic images to a standard size in order to improve the speed of processing by the multichannel neural network model.

Figure 6:
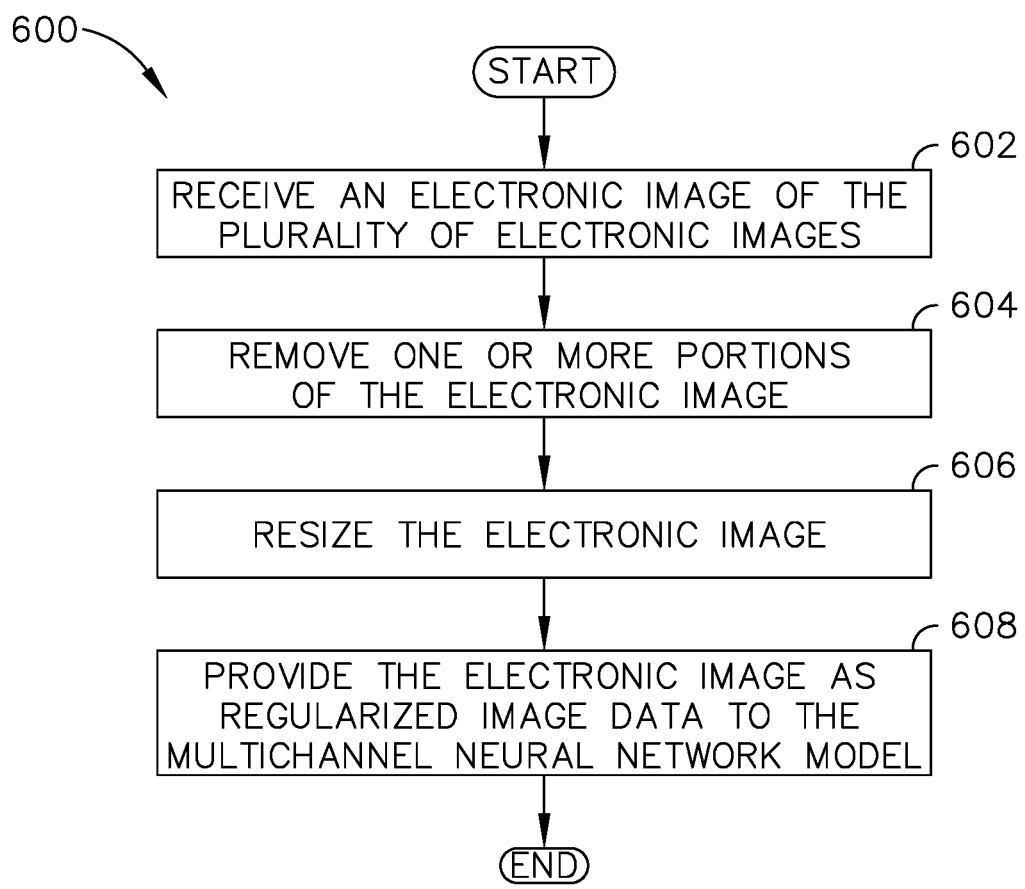
FIG. 6 is a flow diagram of an exemplary pre-processing method.

FIG. 6 illustrates an exemplary pre-processing method 600 for generating regularized image data at block 508, according to some embodiments. In some embodiments, the processor 214 of the aircraft guidance or control system 200 executes computer-executable instruction may be stored in the program memory 212 to implement the pre-processing method 600 to generate such regularized image data. The pre-processing method 600 performs pre-processing of one of the plurality of electronic images to generate regularized image data associated with such electronic image. In embodiments implementing the pre-processing method 600, the pre-processing method 600 is performed for each electronic image of the plurality of electronic images.

At block 602, the processor 214 of the aircraft guidance or control system 200 receives an electronic image of the plurality of electronic images, as discussed above with respect to block 506. In some embodiments, the processor 214 receives the electronic image directly from one of the electronic imaging devices 14. Once the electronic image is received, the electronic image is pre-processed at block 604 and block 606.

At block 604, the processor 214 removes one or more portions of the electronic image. In some embodiments, such portions removed from the electronic image correspond to one or more of the following: sky, a propeller of the aircraft 10, a wing 12 of the aircraft 10, and/or a body of the aircraft 10. In further embodiments, the removed portions correspond to a sky portion of the electronic image and a propeller portion of the electronic image. Removing such portions of the electronic image improves processing by reducing the data to be processed by the multichannel neural network model, as well as by removing confounding features that may be present in the removed portions of the electronic image.

At block 606, the processor 214 resizes the electronic to a standard size in order to improve the speed of processing by the multichannel neural network model. Such resizing may be performed in addition to or as an alternative to removing portions of the electronic image. In some embodiments, resizing the electronic image includes scaling the electronic image to the standard size. In further embodiments, resizing the electronic image includes aligning the electronic image by rotation or translation of the electronic image, such as by aligning a horizon or other feature identified within the electronic image (e.g., a portion of the aircraft 10).

At block 608, the processor 214 provides the pre-processed electronic image as regularized image data used as an input of the multichannel neural network model. In some embodiments, the pre-processed electronic image is associated with one or more additional pre-processed electronic images generated from the plurality of electronic images prior to being provided to the multichannel neural network model.

Returning to FIG. 5, at block 510, the aircraft guidance or control system 200 applies the multichannel neural network model to the regularized image data to generate a preliminary estimate of the cross-track error 304 of the aircraft 10 relative to a position corresponding to the centerline 22 of the taxiway 20. The preliminary estimate of the cross-track error 304 indicates an estimate of a distance between the centerline 22 and the centering position line 302, as discussed above. Applying the multichannel neural network model to the regularized image data may include processing the regularized image data according to a set of rules generated during model training, such as according to the training method 400 discussed above. In some embodiments, the multichannel neural network model is configured to receive the regularized image data in a left channel and a right channel, corresponding to pre-processed electronic images from a left wing electronic imaging device 14 and a right wing electronic imaging device 14. However received, the regularized image data is processed by the multichannel neural network model to generate the preliminary estimate of cross-track error 304.

As discussed above, in some embodiments, the multichannel neural network model is trained to generate preliminary estimates of both cross-track error 304 and a heading of the aircraft 10 relative to the centerline 22, such as the relative heading 308. Such estimate of the heading of the aircraft 10 may be used to improve response of the aircraft guidance or control system 200 in correcting the cross-track error 304, as discussed below. In such embodiments, the multichannel neural network model is configured to apply a set of rules generated during model training, such as according to the training method 400 discussed above, to the regularized image data in order to generate the preliminary estimate of the heading. Such preliminary estimate of the heading may be further post-processed, as discussed below.

At block 512, the aircraft guidance or control system 200 post-processes the preliminary estimate of cross-track error 304 to generate an estimate of the cross-track error 304 suitable for use in control or guidance of the aircraft 10. Post-processing the preliminary estimate of cross-track error 304 uses one or more previous estimates of the cross-track error 304. Such previous estimates of cross-track error 304 may be estimates generated by the aircraft guidance or control method 500 during an earlier time (i.e., based on electronic images captured at an earlier time), which may include preliminary estimates of cross-track error 304. Such previous estimates of cross-track error 304 may also include default estimates that may be updated through one or more periods or iterations of the aircraft guidance or control method 500.

In some embodiments, post-processing the preliminary estimate of cross-track error 304 includes applying a Kalman filter to the preliminary estimate of cross-track error 304 in order to smooth changes to the estimates of cross-track error 304 over time. Applying a Kalman filter includes updating an estimate of the cross-track error 304 using one or more previous estimates of the one or more previous cross-track errors 304 of the aircraft 10 and a new value of the preliminary estimate of the cross-track error 304. By updating the estimate of the cross-track error 304 according to a weighted average of current and previous preliminary estimates of cross-track error 304, applying a Kalman filter reduces the influence of outlier values of the preliminary estimates of the cross-track error 304 generated by the multichannel neural network model. Thus, the estimate of the cross-track error 304 produced by post-processing the data using a Kalman filter is more robust and more accurate, particularly when the input data (i.e., the plurality of electronic images and the regularized image data) is subject to substantial noise.

In embodiments in which the aircraft guidance or control system 200 generates a preliminary estimate of the heading of the aircraft 10, such preliminary estimate of the heading of the aircraft 10 is also post-processed by the aircraft guidance or control system 200 to generate an estimate of the heading of the aircraft 10, such as the relative heading 308. Such post-processing of the estimate of the heading of the aircraft 10 also uses one or more previous estimates of the heading. In some such embodiments, post-processing the estimate of the heading of the aircraft 10 includes applying a Kalman filter to the preliminary estimate of the heading in order to smooth changes to the estimates of the heading of the aircraft 10 over time. Generating an estimate of the heading of the aircraft 10 may be used to improve response of the aircraft guidance or control system 200 in correcting the cross-track error 304, as discussed below.

At block 514, in some embodiments, the aircraft guidance or control system 200 further receives a location estimate from a GPS unit 18 of the aircraft and adjusts the location estimate based upon the estimate of cross-track error 304 generated using the multichannel neural network model and the electronic images. Thus, in such embodiments, the estimate of cross-track error 304 generated by pre-processing electronic images, applying the multichannel neural network model, and post-processing the resulting preliminary estimate of cross-track error 304 may be used to supplement and improve the accuracy of GPS-based location estimates for the aircraft 10.

At block 516, in some embodiments, the aircraft guidance or control system 200 further determines an adjustment to a heading 306 of the aircraft 10 to reduce the cross-track error 304 by directing the aircraft 10 toward the centerline 22 of the taxiway 20. In such embodiments, the aircraft guidance or control system 200 further adjusts a rudder control of the aircraft 10 to implement the adjustment to the heading 306 of the aircraft 10. Thus, the aircraft guidance or control system 200 may use the estimate of cross-track error 304 of the aircraft 10 to improve automated control of the aircraft 10 while taxiing along the ground. Such improvement in control facilitates improved autonomous control of the aircraft 10, particularly for aircraft 10 having autonomous operation functionality. In some such embodiments, the aircraft guidance or control system 200 includes a rudder control unit 240 (e.g., a rudder control module) configured to generate such adjustments to the heading 306 of the aircraft 10 and, in further embodiments, is configured to implement such adjustments.

In some embodiments in which the aircraft guidance or control system 200 generates an estimate of the heading of the aircraft 10, such estimate of the heading is further used (together with the estimate of the cross-track error 304) to determine the adjustment to the heading 306 in order to achieve more accurate control of the aircraft 10.

While various embodiments have been described above, this disclosure is not intended to be limited thereto. Variations can be made to the disclosed embodiments that are still within the scope of the appended claims.

What is claimed:

1. An aircraft guidance or control system for an aircraft, comprising:
   one or more processors;
   a program memory storing (i) a multichannel neural network model and (ii) executable instructions that, when executed by the one or more processors, cause the aircraft guidance or control system to:
   receive a plurality of electronic images from a plurality of electronic imaging devices mounted on the aircraft, wherein the plurality of electronic imaging devices are mounted to capture portions of a taxiway while the aircraft is sitting on or traveling along the taxiway;

process the plurality of electronic images to generate regularized image data;

based upon the regularized image data, generate a preliminary estimate of a cross-track error of the aircraft relative to a centerline position of the taxiway by applying the multichannel neural network model to the regularized image data; and post-process the preliminary estimate of the cross-track error to generate an estimate of the cross-track error using one or more previous estimates of one or more previous cross-track errors of the aircraft.

2. The aircraft guidance or control system of claim 1, wherein the executable instructions further cause the aircraft guidance or control system to:

receive a location estimate of the aircraft from a Global Positioning System (GPS) unit of the aircraft; and adjust the location estimate based upon the estimate of the cross-track error.

3. The aircraft guidance or control system of claim 1, wherein the executable instructions further cause the aircraft guidance or control system to:

determine an adjustment to a heading of the aircraft to reduce the cross-track error by directing the aircraft toward the centerline position of the taxiway; and adjust a rudder control of the aircraft to implement the adjustment to the heading of the aircraft.

4. The aircraft guidance or control system of claim 1, wherein the executable instructions that cause the aircraft guidance or control system to process the plurality of electronic images cause the aircraft guidance or control system to:

remove one of more portions of each of the plurality of electronic images, corresponding to one or more of the following: sky, a propeller of the aircraft, a wing of the aircraft, or a body of the aircraft; and resize each of the plurality of electronic images to a standard size.

5. The aircraft guidance or control system of claim 1, wherein the executable instructions that cause the aircraft guidance or control system to post-process the preliminary estimate of the cross-track error cause the aircraft guidance or control system to:

apply a Kalman filter to the preliminary estimate of the cross-track error to smooth changes to estimates of cross-track error over time using the one or more previous estimates of the one or more previous cross-track errors.

6. The aircraft guidance or control system of claim 1, wherein the executable instructions further cause the aircraft guidance or control system to:

calibrate the plurality of electronic imaging devices based upon one or more positions of one or more external portions of the aircraft within the plurality of electronic images.

7. The aircraft guidance or control system of claim 1, further comprising the plurality of electronic imaging devices, wherein:

the plurality of electronic imaging devices includes at least a left wing electronic imaging device mounted on a left wing of the aircraft and a right wing electronic imaging device mounted on a right wing of the aircraft;

the plurality of electronic images includes a left channel having electronic images from the left wing electronic imaging device and a right channel having electronic images from the right wing electronic imaging device; and the multichannel neural network model is configured to receive pre-processed versions of the left channel and the right channel in the regularized image data.

8. A computer-implemented method for aircraft guidance or control, comprising:

accessing, by one or more processors, a multichannel neural network model stored in a program memory;

receiving, at one or more processors, a plurality of electronic images from a plurality of electronic imaging devices mounted on an aircraft, wherein the plurality of electronic imaging devices are mounted to capture portions of a taxiway while the aircraft is sitting on or traveling along the taxiway;

processing, by the one or more processors, the plurality of electronic images to generate regularized image data;

generating, by the one or more processors and based upon the regularized image data, a preliminary estimate of a cross-track error of the aircraft relative to a centerline position of the taxiway by applying the multichannel neural network model to the regularized image data; and post-processing, by the one or more processors, the preliminary estimate of the cross-track error to generate an estimate of the cross-track error using one or more previous estimates of one or more previous cross-track errors of the aircraft.

9. The computer-implemented method of claim 8, further comprising:

receiving, at the one or more processors, a location estimate of the aircraft from a Global Positioning System (GPS) unit of the aircraft; and adjusting, by the one or more processors, the location estimate based upon the estimate of the cross-track error.

10. The computer-implemented method of claim 8, further comprising:

determining, by the one or more processors, an adjustment to a heading of the aircraft to reduce the cross-track error by directing the aircraft toward the centerline position of the taxiway; and adjusting, by the one or more processors, a rudder control of the aircraft to implement the adjustment to the heading of the aircraft.

11. The computer-implemented method of claim 8, wherein:

processing the plurality of electronic images includes removing one of more portions of each of the plurality of electronic images, corresponding to one or more of the following: sky, a propeller of the aircraft, a wing of the aircraft, or a body of the aircraft; and post-processing the preliminary estimate of the cross-track error includes applying a Kalman filter to the preliminary estimate of the cross-track error to smooth changes to estimates of cross-track error over time using the one or more previous estimates of the one or more previous cross-track errors.

12. The computer-implemented method of claim 8, further comprising:

generating, by one or more measurement devices and one or more training electronic imaging devices, a training dataset containing a plurality of data points, each data point including the following: (i) a set of a plurality of training images and (ii) an error measurement associated with the set of training images and indicating a distance from a training centerline of a training taxiway;

generating, by one or more additional processors, the multichannel neural network model by:
  accessing the training dataset containing the plurality of data points; and
  training a base model by applying a training algorithm to the data points in the training dataset as inputs to obtain the multichannel neural network model; and storing, in the program memory, the multichannel neural network model.

13. The computer-implemented method of claim 12, wherein generating the multichannel neural network model further comprises:
  generating augmented data points by applying one or more of the following data augmentations to one or more of the training images of one or more of the data points in the training dataset: vertical jitter, rotation, or anomalous image artifacts; and
  further training the base model by applying the training algorithm to the augmented data points as further inputs to obtain the multichannel neural network model.

14. The computer-implemented method of claim 12, wherein:
  each data point in the training dataset further includes the following: a heading relative to the training centerline of the training taxiway associated with the set of training images;
  generating the preliminary estimate of the cross-track error includes generating a preliminary estimate of a heading of the aircraft relative to the centerline position of the taxiway by applying the multichannel neural network model to the regularized image data; and
  post-processing the preliminary estimate of the cross-track error includes post-processing the preliminary estimate of the heading to generate an estimate of the heading of the aircraft.

15. The computer-implemented method of claim 12, wherein the base model is an inverted residual block model.

16. A tangible, non-transitory computer-readable medium storing executable instructions for aircraft guidance or control, which executable instructions, when executed by one or more processors of a computer system, cause the computer system to:
  access a multichannel neural network model stored in a program memory;
  receive a plurality of electronic images from a plurality of electronic imaging devices mounted on an aircraft, wherein the plurality of electronic imaging devices are mounted to capture portions of a taxiway while the aircraft is sitting on or traveling along the taxiway;
  process the plurality of electronic images to generate regularized image data;
  based upon the regularized image data, generate a preliminary estimate of a cross-track error of the aircraft relative to a centerline position of the taxiway by applying the multichannel neural network model to the regularized image data; and
  post-process the preliminary estimate of the cross-track error to generate an estimate of the cross-track error using one or more previous estimates of one or more previous cross-track errors of the aircraft.

17. The tangible, non-transitory computer-readable medium of claim 16, wherein the executable instructions further cause the computer system to:
  receive a location estimate of the aircraft from a Global Positioning System (GPS) unit of the aircraft; and
  adjust the location estimate based upon the estimate of the cross-track error.

18. The tangible, non-transitory computer-readable medium of claim 16, wherein the executable instructions further cause the computer system to:
  determine an adjustment to a heading of the aircraft to reduce the cross-track error by directing the aircraft toward the centerline position of the taxiway; and
  adjust a rudder control of the aircraft to implement the adjustment to the heading of the aircraft.

19. The tangible, non-transitory computer-readable medium of claim 16, wherein the executable instructions that cause the computer system to process the plurality of electronic images cause the computer system to:
  remove one of more portions of each of the plurality of electronic images, corresponding to one or more of the following: sky, a propeller of the aircraft, a wing of the aircraft, or a body of the aircraft; and
  resize each of the plurality of electronic images to a standard size.

20. The tangible, non-transitory computer-readable medium of claim 16, wherein the executable instructions that cause the computer system to post-process the preliminary estimate of the cross-track error cause the computer system to:
  apply a Kalman filter to the preliminary estimate of the cross-track error to smooth changes to estimates of cross-track error over time using the one or more previous estimates of the one or more previous cross-track errors.

* * * * *